United States Patent [19]

Nakano

[11] Patent Number: 5,065,352
[45] Date of Patent: Nov. 12, 1991

[54] DIVIDE APPARATUS EMPLOYING MULTIPLIER WITH OVERLAPPED PARTIAL QUOTIENTS

[75] Inventor: Hiraku Nakano, Kyoto, Japan

[73] Assignee: Matsushita Electric Industrial Co., Ltd., Osaka, Japan

[21] Appl. No.: 555,689

[22] Filed: Jul. 23, 1990

[30] Foreign Application Priority Data

Aug. 16, 1989 [JP] Japan .................... 1-210021

[51] Int. Cl.⁵ .............................. G06F 7/52
[52] U.S. Cl. ................................. 364/765
[58] Field of Search .............. 364/764, 765, 754

[56] References Cited

U.S. PATENT DOCUMENTS 3,828,175 8/1974 Amdahl et al. ............... 364/765
4,707,798 11/1987 Nakano .......................... 364/765
4,725,974 2/1988 Kanazawa .................... 364/765

FOREIGN PATENT DOCUMENTS 53-42505 11/1978 Japan .
60-142738 7/1985 Japan .

OTHER PUBLICATIONS

"IEEE Standard for Binary Floating-Point Arithmetic" by the Institute of Electrical and Electronics Engineers, Inc., Aug. 12, 1985, pp. 7-18.

*Primary Examiner*—Dale M. Shaw
*Assistant Examiner*—Long T. Nguyen
*Attorney, Agent, or Firm*—Lowe, Price, LeBlanc & Becker

[57] ABSTRACT

An approximate reciprocal M of a divisor $D_0$ is determined in dependence on predetermined higher order bits of the divison $D_0$. A dividend $N_0$ is multiplied by the approximate reciprocal M to derive a quotient. During this multiplication, the following reiterative calculations are executed.

$$A = 1 - D_0 \times M$$

$$Q_1 + N_1 = N_0 \times M$$

$$Q_i + N_i = A \times Q_{i-1} + N_{i-1} \ (i \geq 2)$$

where $Q_i$ denotes a partial quotient, and $N_i$ denotes a number obtained by subtracting $Q_i$ from an $(i-1)$-th partial remainder multiplied by M. In addition, the following calculation is executed.

$$Q_{LAST+1} + N_{LAST+1} = A \times (Q_{LAST} + X) + N_{LAST}$$

where $Q_{LAST}$ denotes a last partial quotient, and X denotes a number having a magnitude corresponding to a lower bit of the last partial quotient $Q_{LAST}$. A final quotient Q* is calculated from the partial quotients by reference to the following equation.

$$Q^* = Q_1 + Q_2 + \ldots + Q_{LAST} + Y(\text{the highest digit of } Q_{LAST+1})$$

The final quotient Q* is outputted.

3 Claims, 5 Drawing Sheets

DIVIDE APPARATUS EMPLOYING MULTIPLIER WITH OVERLAPPED PARTIAL QUOTIENTS

BACKGROUND OF THE INVENTION

1. Field of the Invention

This invention relates to a divide apparatus usable in various systems such as data processing systems.

2. Description of the Prior Art

U.S. Pat. No. 4,707,798 corresponding to Japanese published unexamined patent application 60-142738 discloses a divide apparatus for use in a data processing system. The divide apparatus of U.S. Pat. No. 4,707,798 includes a partial quotient correction circuit. The partial quotient correction circuit is required to execute both addition and substraction, so that the circuit includes an adder and a subtracter. Thus, the structure of the divide apparatus of U.S. Pat. No. 4,707,798 is complicated.

It is desirable to increase the speed of execution of division relative to the speed in the prior art apparatus.

SUMMARY OF THE INVENTION

It is an object of this invention to provide an improved divide apparatus.

According to this invention, a divide apparatus comprises means for determining an approximate reciprocal M of a divisor $D_0$ in dependence on predetermined higher order bits of the divisor $D_0$; multiplying means for multiplying a dividend $N_0$ by the approximate reciprocal M to derive a quotient; said multiplying means including means for executing the following reiterative calculations:

$$A = 1 - D_0 \times M$$

$$Q_1 + N_1 = N_0 \times M$$

$$Q_i + N_i = A \times Q_{i-1} + N_{i-1} (i \geq 2)$$

where $Q_i$ denotes a partial quotient, and $N_i$ denotes a number obtained by subtracting $Q_i$ from an $(i-1)$-th partial remainder; the multiplying means including means for executing the following calculation:

$$Q_{LAST+1} + N_{LAST+1} = A \times (Q_{LAST} + X) + N_{LAST}$$

where $Q_{LAST}$ denotes a last partial quotient, and X denotes a number having a magnitude corresponding to a lowest bit of the last partial quotient $Q_{LAST}$; means connected to said multiplying means for storing the respective partial quotients $Q_1, Q_2, \ldots, Q_{LAST}$; and means for calculating a final quotient $Q^*$ from the partial quotients by reference to the following equation:

$$Q^* = Q_1 + Q_2 + \ldots + Q_{LAST} + Y(\text{the highest digit of } Q_{LAST+1})$$

and for outputting the final quotient $Q^*$.

THEORETICAL BASE OF THE INVENTION

Figure 1:
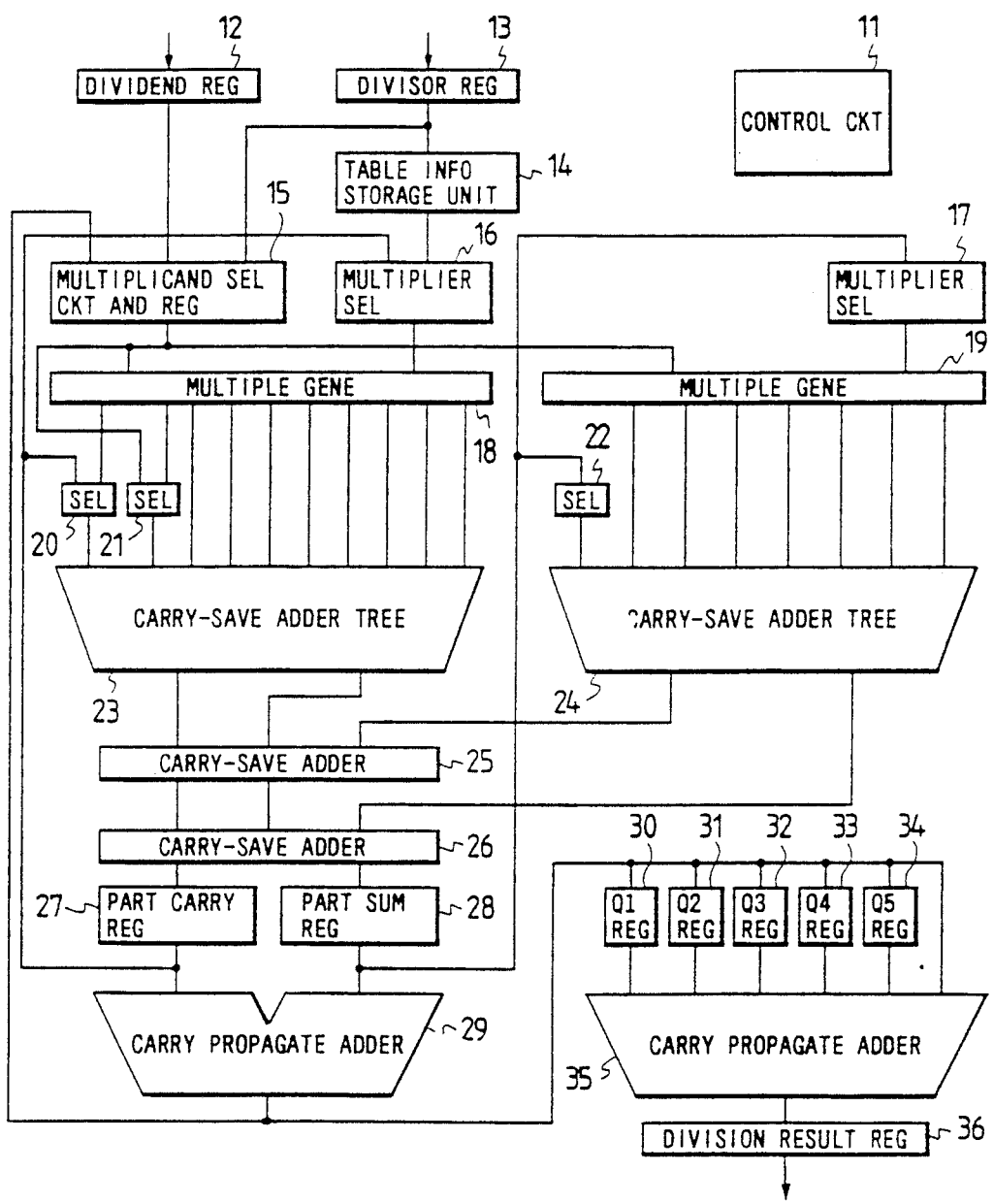
FIG. 1 is a block diagram of a divide apparatus according to a first embodiment of this invention.

The reason why the partial quotient correction circuit of U.S. Pat. No. 4,707,798 requires the subtracter is that a partial quotient can have either a positive sign or a negative sign. A good way of removing the subtracter is forcing the sign of a partial quotient to be always positive.

Whether a fixed point notation without an exponent term or a floating point notation with an exponent term is used for representing a number, in order to perform a division of a P-base number, first the divisor and the dividend are normalized so that they can be represented by the following equations (1) and (2), and an intermediate quotient is calculated wherein $D_0$ denotes a divisor after being normalized and $N_0$ denotes a dividend after being normalized.

$$D_0 = \sum_{k=0}^{\infty} D_{0,k} \times P^{-k} \tag{1}$$

where $D_{0,k}$ is zero or a positive integer; $0 \leq D_{0,k} < P$; and $$D_{0,0} \neq 0. \tag{2}$$

$$N_0 = \sum_{k=0}^{\infty} N_{0,k} \times P^{-k} \tag{2}$$

where $N_{0,k}$ is zero or a positive integer; $0 \leq N_{0,k} < P$; and $N_{0,0} \neq 0$.

At this time, the obtained intermediate quotient Q is within a range of the following formula (3), that is, either in a normalized form or in an underflowing-by-one-lower-digit form.

$$P^{-1} < Q < P \tag{3}$$

$$\left[ \cdot \cdot \frac{1}{\sum_{k=0}^{\infty} (P-1) \times P^k} < Q = \frac{N_0}{D_0} < \frac{\sum_{k=0}^{\infty} (P-1) \times P^k}{1} \right]$$

In the case of a fixed point notation, after the calculation of the intermediate quotient, the number of digit shift counts required for normalizing the divisor is subtracted by the number of digit shift counts required for normalizing the dividend. If the resultant difference is positive (digit shift to the left is defined as being positive), the intermediate quotient Q is shifted to the left by the difference number of digit shift counts so that a final quotient can be obtained. If the difference is negative, the intermediate quotient Q is shifted to the right by the difference number of digit shift counts so that a final quotient can be obtained.

In a floating point notation, a first difference is obtained by subtracting the exponent term of the divisor from the exponent term of the dividend and a second difference is obtained by subtracting the number of digit shift counts required for normalizing the fixed point term of the divisor from the number of digit shift counts required for normalizing the dividend, and the result of addition between the first difference and the second difference is used as an exponent term of the division result. Furthermore, if the intermediate quotient is in an underflow form, 1 is subtracted from the exponent term to normalize the fixed point term. As a result of these processes, a final quotient can be obtained.

Since a sign of the quotient can be algebraically determined by the signs of the divisor and the dividend, the intermediate quotient may be calculated by using, if required, the absolute and normalized values of the divisor and the dividend. If the final quotient is negative, the intermediate quotient is changed to have a desired representation.

With the previously-mentioned assumptions, the divisor and the dividend will be handled hereinafter in the absolute and normalized form as in the formulas (1) and (2). Symbols used herein will now be explained.

M: approximate reciprocal of a divisor $D_0$
$Q_i$: i-th partial quotient
$R_i$: i-th partial remainder where $R_0 = N_0$
$N_i$: number obtained by subtracting $Q_i$ from the product of $R_{i-1}$ and M
A: multiplicand number multiplied by $Q_i$ when $Q_{i+1} + N_{i+1}$, which is M times as large as the i-th partial remainder $R_i$, is calculated from $Q_i$ and $N_i$
$\alpha+1$: the number of digits of a partial quotient wherein partial quotients neighboring in sequence number overlap each other by one digit
Q: correct quotient which becomes recurring decimals and has the infinite number of digits if the dividend can not be divided by the divisor without leaving a remainder
$Q_{LAST}$: last ($LAST$-th) partial quotient
$Q^*$: number obtained by taking out the lowest digit of $Q_{LAST}$ and higher digits from Q, that is, number obtained by omitting digits, which are lower in position than the lowest digit of $Q_{LAST}$, from Q
X: number in the lowest digit of $Q_{LAST}$ and having a magnitude of 1
Y: the highest digit of $Q_{LAST+1}$ which has the same position as X when a partial remainder $R_{LAST}$ multiplied by M, that is, $Q_{LAST+1} + N_{LAST+1}$, is calculated with $Q_{LAST}+X$ being used as a partial quotient.

A sufficient condition for obtaining $(\alpha+1)$ digits in a partial quotient is determined by selecting M so as to suffice the following formula (4).

$$1 - P^{-(\alpha+2)} < D_0 \times M < 1 \tag{4}$$

Before reiterative calculations are started, the calculations shown by the following formulas (5) and (6) are performed.

$$A = 1 - D_0 \times M \tag{5}$$

$$Q_1 + N_1 = N_0 \times M \tag{6}$$

In the reiterative calculations, the partial quotient is solved in such a way as shown in the following formulas (7).

$$Q_i + N_i = A \times Q_{i-1} + N_{i-1} (2 \leq i \leq \text{LAST}) \tag{7}$$

Finally, the calculation shown by the following formula (8) is performed and the number $Q^*$ corresponding to a final quotient is calculated by referring to the following formula (9) to examine the presence and the absence of a contribution of $Q_{LAST+1}$ and a lower part to $Q^*$.

$$Q_{LAST+1} + N_{LAST+1} = A \times (Q_{LAST}+X) + N_{LAST} \tag{8}$$

$$Q^* = Q_1 + Q_2 + \ldots + Q_{LAST} + Y \tag{9}$$

A final quotient can be obtained from the previously-mentioned processes. This is clarified by proving the following items (A) to (C).

ITEM (A)

"A" can be used for arbitrary $i \geq 2$, and the number obtained through the formula (7) equals the number obtained by multiplying the (i-th)-th partial remainder $R_{i-1}$ by the approximate reciprocal M of the divisor.

ITEM (B)

$Q_1$ is positive and has $(\alpha-1) \sim (\alpha+1)$ digits. When $Q_1$ is compared with the correct quotient Q at a position equal to or above $P^{-\alpha}$, it is equal to or smaller by $P^{-\alpha}$. In other words, there are the following relations (10) and (11).

$$P^{-2} < Q_1 < P \tag{10}$$

$$0 < R_1 = (Q_2 + N_2)/M < D_0 \times P^{-\alpha} \times 2 \tag{11}$$

ITEM (C)

$Q_i (i \geq 2)$ is either positive or zero, and has $(\alpha+1)$ digits at the position of $P^{-(i-1)\alpha} \sim P^{-i\alpha}$. When $Q_i$ is compared with the correct quotient Q at the position corresponding to $Q_i$, it is equal to or smaller by $P^{-i\alpha}$. In other words, there are the following relations (12) and (13).

$$0 < Q_i + N_i < P^{-(i-1)\alpha+1} \tag{12}$$

$$0 < R_i = (Q_{i+1} + N_{i+1})/M < D_0 \times P^{-i\alpha} \times 2 \tag{13}$$

DEMONSTRATION OF ITEM (A)

For $i = 2$, $$\begin{aligned}
Q_2 + N_2 &= R_2 \times M \\
&= (N_0 - D_0 \times Q_1) \times M \\
&= N_0 \times M - D_0 \times Q_1 \times M \\
&= Q_1 + N_1 - D_0 \times Q_1 \times M \\
&= (1 - D_0 \times M) \times Q_1 + N_1 \\
&= A \times Q_1 + N_1
\end{aligned}$$

so that the item (A) is proved.

If it is assumed that the item (A) is proved for $i = k$ and that $Q_k + N_k = R_{k-1} \times M = A \times Q_{k-1} + N_{k-1}$, then $$\begin{aligned}
Q_{k+1} + N_{k+1} &= R_k \times M \\
&= (R_{k-1} - D_0 \times Q_k) \times M \\
&= \left(\frac{Q_k + N_k}{M} - D_0 \times Q_k\right) \times M \\
&= Q_k + N_k - D_0 \times Q_k \times M \\
&= (1 - D_0 \times M) \times Q_k + N_k \\
&= A \times Q_k + N_k
\end{aligned}$$

so that the item (A) is also proved for $i=k+1$. Since the item (A) has previously been proved for $i=2$, the item (A) is proved for any arbitrary $i \geq 2$ by introducing a mathematical induction method.

DEMONSTRATION OF ITEM (B)

Each term in the formula (4) is multiplied by the correct quotient Q, and the following relation (14) results.

$$Q - Q \times P^{-(a+2)} < Q_1 + N_1 = N_0 \times M < Q \tag{14}$$

From the formulas (3) and (14), the relation "$P-2 < Q_1 < P$" is established.

$$0 < R_1 \times M = Q_2 + N_2 = (1 - D_0 \times M) \times Q_1 \times N_1 < P^{-a} \tag{15}$$

This is because $Q_1 < P$, $0 < N_1 < P^{-a}$, and $0 < 1 - D_0 \times M < P^{-(a+2)}$ from the formula (4). In addition, from the formula (4), $0 < 1/M < D_0/\{1 - P^{-(a+2)}\} < 2D_0$. Thus, the outer term of the inequality in the formula (15) is multiplied by $2D_0$ while the inner term is multiplied by $1/M$, and the following formula is obtained.

$$0 < R_1 = (Q_2 + N_2)/M < 2D_0 \times P^{-a} = D_0 \times P^{-a} \times 2$$

DEMONSTRATION OF ITEM (C)

For $i=2$, the following relation is obtained from the formula (15).

$$0 < Q_2 \times N_2 < P^{-a} < P^{-a+1}$$

Thus, the formula (12) can be established.

$$0 < R_2 \times M = (1 - D_0 \times M) \times Q_2 + N_2$$
$$< P^{-(a+2)} \times P^{-a} + N_2$$
$$< P^{-2(a+1)} + P^{-2a} = P^{-2a}(1 + P^{-2})$$

From the formula (4), the following relation is established.

$$0 < 1/M < D_0/\{1 - P^{-(a+2)}\}$$

The outer term of the above-mentioned inequality is multiplied by $D_0/\{1-P^{-(a+2)}\}$ and the inner term is multiplied by $1/M$, and thereby the following formula (16) is obtained.

$$0 \leq R_2 = \frac{Q_3 + N_3}{M} < D_0 \times \tag{16}$$

$$P^{-2a} \times \frac{1 + P^{-2}}{1 - P^{-(a+2)}} < D_0 \times P^{-2a} \times 2$$

It should be noted that the function $f(x) = (1+x^{-2})/\{1-x^{-(a+2)}\}$ monotonically decreases in the variation region "$x \geq 2$" and reaches the maximal value "$5/(4-2^{-a})$" at $x=2$, and that the maximal value is a monotonically decreasing function with respect to $a$ in the variation region $a \geq 1$ and is equal to $10/7$ at $a=1$. Thus, the formula (13) can be established for $i=2$. It is now assumed that the following relations (17) and (18) are satisfied for $i=k$.

$$0 = Q_k + N_k < P^{-(k-1)a+1} \tag{17}$$

$$0 < R_k = \frac{Q_{k+1} + N_{k+1}}{M} < D_0 \times P^{-ka} \times 2 \tag{18}$$

In this case, the following formula is obtained.

$$0 < Q_{k+1} + N_{k+1} = (1 - D_0 \times M) \times Q_k + N_k < P^{-(a+2)} \times$$
$$P^{-(k-1)a+1} + P^{-ka}$$
$$= P^{-ka}(1 + P^{-1}) < P^{-ka+1}$$

Thus, the formula (12) can be established also for $i=k+1$.

$$R_{k+1} \times M = Q_{k+2} + N_{k+2}$$
$$= (1 - D_0 \times M) \times Q_{k+1} + N_{k+1} <$$
$$P^{-(a+2)} \times P^{-ka+1} + P^{-(k+1)a}$$
$$= P^{-(k+1)a}(1 + P^{-1})$$

From the formula (4), $0 < 1/M < D_0/\{1 - P^{-(a+2)}\}$. Thus, the outer term of the above-mentioned inequality is multiplied by $D_0/\{1-P^{-(a+2)}\}$ and the inner term is multiplied by $1/M$, and thereby the following formula (19) is obtained.

$$0 < R_{k+1} = \frac{Q_{k+2} + N_{k+2}}{M} < D_0 \times P^{-(k+1)a} \times \tag{19}$$

$$\frac{1 + P^{-1}}{1 - P^{-(a+2)}} < D_0 \times P^{-(k+1)a} \times 2$$

It should be noted that the function $f(x) = (1+x^{-1})/\{1-x^{-(a+2)}\}$ monotonically decreases in the variation region "$x \geq 2$" and reaches the maximal value "$6/(4-2^{-a})$" at $x=2$, and that the maximal value is a monotonically decreasing function with respect to $a$ in the variation region $a \geq 1$ and is equal to $12/7$ at $a=1$. Thus, the formula (13) can be established also for $i=k+1$. Since the validity of the formulas (12) and (13) has previously been proved for $i=2$, the formulas (12) and (13) can be established also for an arbitrary $i \geq 2$ by introducing a mathematical induction method.

It is understood from the item (C) that the result of the sum of the partial quotients calculated from the formulas (6) and (7) is compared with the correct quotient Q at a position equal to or above the position of the lowest digit of $Q_{LAST}$, it can be smaller by $P^{-LAST \times a}$. This makes it possible to understand that $P^{-LAST \times a}$ is multiplied by $D_0 \times M$ and is concealed in $N_{LAST}$. Accordingly, $P^{-LAST \times a}$ is added to $Q_{LAST}$ while $P^{-LAST \times a}$ is subtracted from $N_{LAST}$, and the remainder "$R_{LAST}/M$" is obtained and thereby the following formula (20) is obtained.

$$\frac{R_{LAST}}{M} = Q_{LAST+1} + N_{LAST+1} \tag{20}$$

$$= A \times (Q_{LAST} + P^{-LAST \times a}) + (N_{LAST} - P^{-LAST \times a})$$

When it is necessary to correct $Q_{LAST}$ with $P^{-LAST \times a}$, the remainder given by the equation (20) is positive or zero. When the correction is unnecessary, the remainder given by the equation (20) is negative. The boundary of the judgment about the presence and absence of the correction of $Q_{LAST}$ is shifted from zero to P$-^{LASTXa}$ in place of the subtraction of P$-^{LASTXa}$ from N$_{LAST}$ in the formula (8), and the use of the formula (9) produces a quotient which agrees with the correct quotient Q at positions equal to and above P$-^{LASTXa}$.

DESCRIPTION OF THE FIRST PREFERRED EMBODIMENT

FIG. 1 shows a divide apparatus according to a first embodiment of this invention. With reference to FIG. 1, a control circuit 11 carries out the control of a whole system including a dividend register 12, a divisor register 13, a table information storage unit 14, a multiplicand selection circuit and register 15, multiplier selection circuits 16 and 17, multiple generation circuits 18 and 19, selection circuits 20, 21, and 22, carry-save adder trees 23 and 24, carry-save adders 25 and 26, a partial carry register 27, a partial sum register 28, a carry propagate adder 29, registers 30–34 for Q$_1$–Q$_5$, a carry propagate adder 35, and a division result register 36.

The division is performed in the following sequence. An approximate reciprocal M is read out from the table information storage unit 14 by using given higher bits of a normalized divisor D$_0$ set in the divisor register 13 as an address for access to the table information storage unit 14. An example of a way of determining stored information in the table information storage unit 14 will be shown hereinafter.

With respect to the binary divisor expressed by the formula (1), the approximate reciprocal M is obtained by referring to the following equation (21).

$$\frac{1}{1 + \sum_{k=1}^{13} D_{0 \cdot k} \cdot 2^{-k} + 2^{-13}} = 2^{-1} + \sum_{k=2}^{\infty} M_k \cdot 2^{-k} \quad (21)$$

The obtained approximate reciprocal M is expressed as:

$$M = 2^{-1} + \sum_{k=2}^{16} M_k \cdot 2^{-k} + (1 - D_{0,14}) \cdot 2^{-16} \quad (22)$$

Since the first term of the right side of the equation (22) is fixed and it is good for the third term that $\overline{D_{0,14}}$ is added as the lowest bit of a multiplier, it is sufficient that 15 bits from M$_2$ to M$_{16}$ are stored in the table. With respect to the accuracy of the approximate reciprocal determined by the equations (21) and (22), the following equation (23) is satisfied.

$$0.FF808F8 \leq D_0 \times M < 1 \text{(hexadecimal notation)} \quad (23)$$

The value of D$_0 \times$M was checked by using a computer in the following way. The approximate reciprocal M is a constant in the following interval:

$$\left(1 + \sum_{k=1}^{14} D_{0,k} \cdot 2^{-k}, 1 + \sum_{k=1}^{14} D_{0,k} \cdot 2^{-k} + 2^{-14}\right)$$

Figure 2:
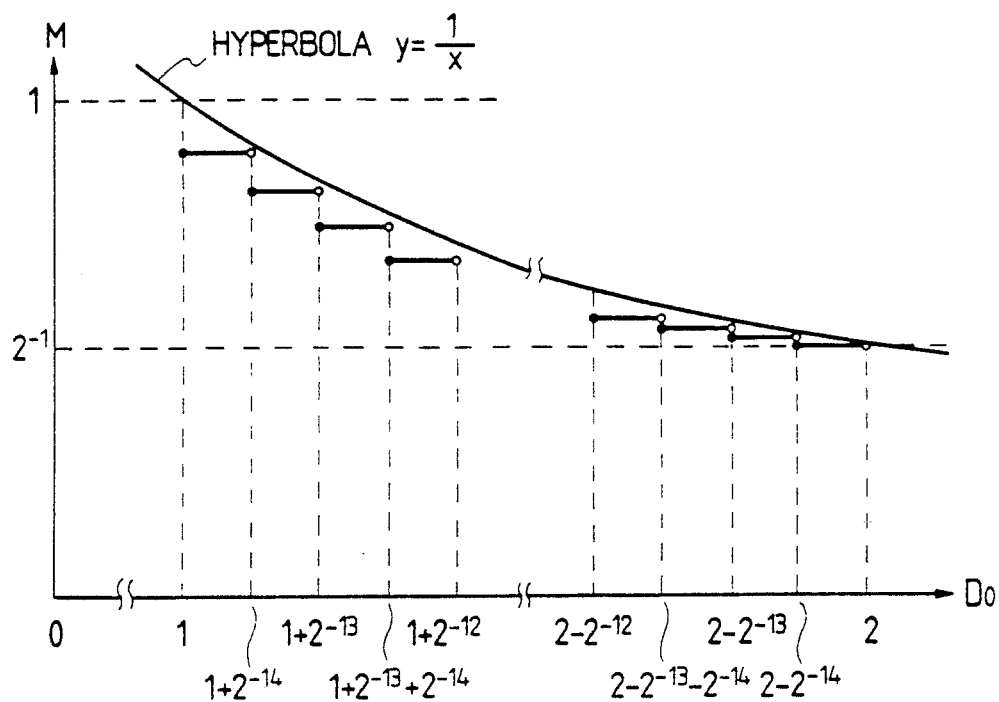
FIGS. 2 and 3 are diagrams showing the accuracy of an approximate reciprocal of a divisor in the divide apparatus of FIG. 1.
Figure 3:
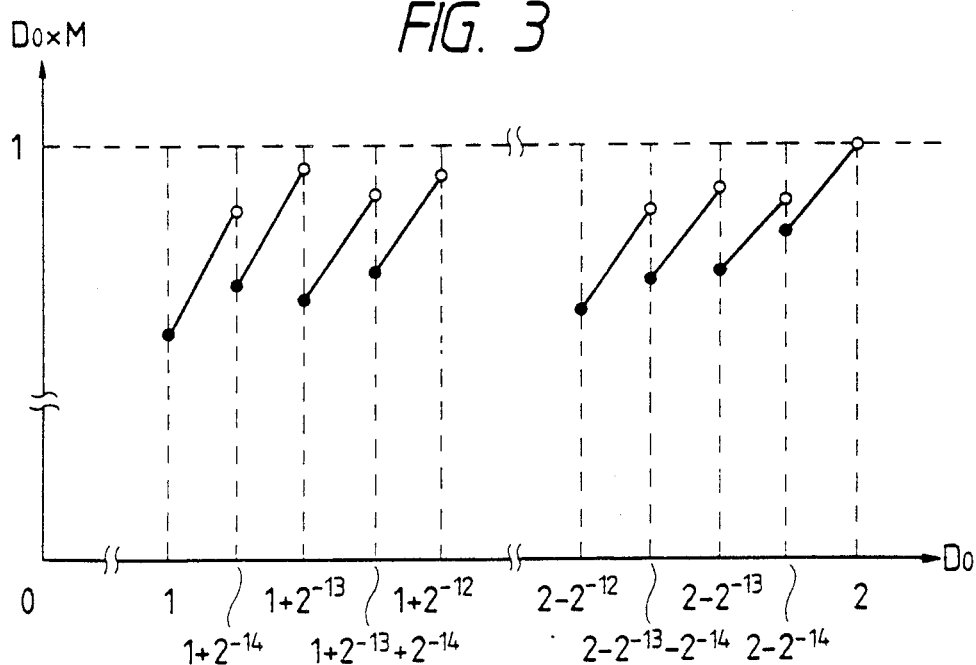

As shown in FIG. 2, in the interval "$1 \leq D_0 < 2$", the approximate reciprocal M is a step function having $2^{14} = 16384$ line segments of a $2^{-14}$ length. As shown in FIG. 3, the graph for D$_0 \times$M has 16384 line segments in the form of a saw tooth.
Therefore, Lower limit (also the minimum value) of D$_0 \times$M: the minimum value of the left ends of the 16384 line segments Upper limit of D$_0 \times$M: the maximum value of the right ends of the 16384 line segments The reciprocal read out from the table information storage unit 14 is added with $2^{-1}$ and $\overline{D_{0,14}}$, and first the multiplier selection circuit 16 outputs $-$M. The multiplication between $-$M and the divisor D$_0$ set in the multiplicand selection circuit and register 15 which relates to the equation (5) is performed by the multiple generation circuit 18, the carry-save adder tree 23, the carry-save adders 25 and 26, the partial carry register 27, the partial sum register 28, and the carry propagate adder 29.

A partial carry and a partial sum of D$_0 \times (-$M$)$ are set in the partial carry register 27 and the partial sum register 28 respectively. At the same time, the normalized dividend N$_0$ outputted from the dividend register 12 is set in the dividend selection circuit 15, and the multiplier selection circuit 16 selects the approximate reciprocal M. The multiplication "N$_0 \times$M" of the equation (6) is performed similarly to the execution of the multiplication "D$_0 \times (-$M$)$". Thus, a partial carry and a partial sum of N$_0 \times$M are set in the partial carry register 27 and the partial sum register 28 respectively. At the same time, the product of N$_0 \times$M is set in the multiplicand selection circuit and register 15 with a carry of two degrees or greater being made zero (this is equivalent to the addition of D$_0 \times (-$M$)+1$). In the calculation of the product of D$_0 \times (-$M$)$ and the product of N$_0 \times$M, the multiplier selection circuit 17 and the selection circuit 22 output "0", and therefore the output of the carry-save adder tree 24 is "0" for both of the partial carry and the partial sum and the selection circuits 20 and 21 select the output of the multiple generation circuit 18.

Figure 5:
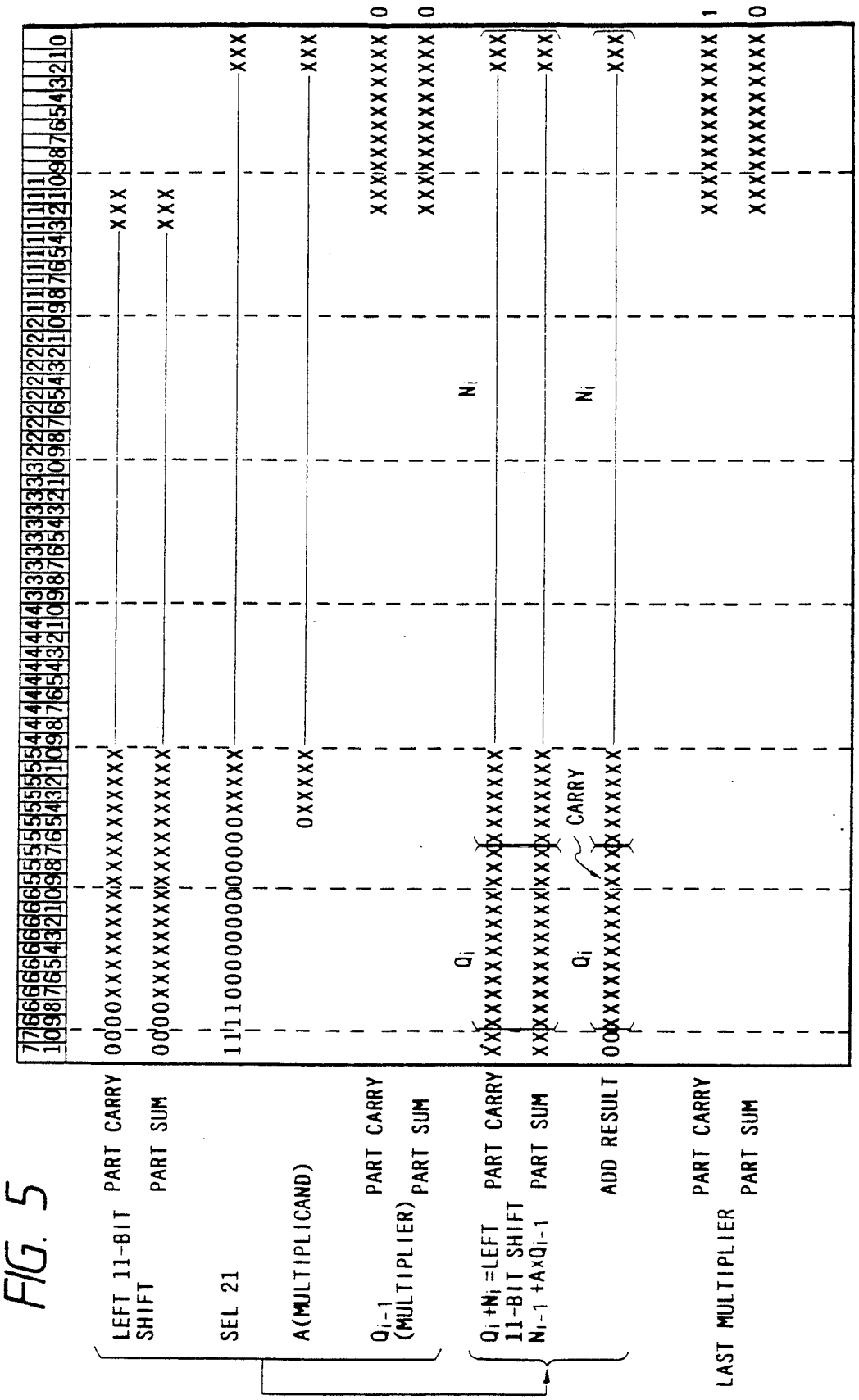

Subsequently, the reiterative calculations shown in the equation (7) are performed while Q$_{i-1}$ and N$_{i-1}$ are held in the form of a partial carry and a partial sum as follows. The partial carry and the partial sum of Q$_{i-1}$ which are outputted from the partial carry register 27 and the partial sum register 28 are selected by the multiplier selection circuits 16 and 17 respectively. The partial carry and the partial sum of N$_{i-1}$ which are outputted from the partial carry register 27 and the partial sum register 28 are selected by the selection circuits 20 and 22 respectively. A carry from N$_{i-1}$ to Q$_{i-1}$ upon the addition of the partial carry and the partial sum is calculated from a carry look-ahead circuit contained in the carry propagate adder 29. In the presence of such a carry, the selection circuit 21 sets a negative number into given higher bits of an originally generated multiple of "A". In this case, N$_{i-1}$ is in an over-added state with regard to the partial carry and the partial sum of N$_{i-1}$, and the negative number serves to cancel the carry from N$_{i-1}$ to Q$_{i-1}$. In FIG. 5, "1111" in the highest bit and the subsequent three higher bits in the part SEL 21 corresponds to the negative number.

Partial quotients outputted from the carry propagate adder 29 are sequentially set in the registers 30–34. Finally, the calculation of the equation (8) is performed. The calculation of the equation (8) is similar to the calculation of the equation (7) except for the following points. After the multiplier selection circuit 16 adds "1" to the end of the partial carry of Q$_{LAST}$, the addition of the equation (9) is executed by the carry propagate adder 35 and the resultant quotient Q* is set in the division result register 36. The addition by the carry propagate adder 35 differs from a normal addition of two numbers as follows. In the addition by the carry propagate adder 35, α bits are used as a group unit, and it is sufficient that the highest bits of respective partial quotients, the remaining bits thereof, and Y are added as group carries, addition results corresponding to bits of the two numbers, and an initial carry respectively. This is because the lowest digit of each of the partial quotients can be smaller by 1 but is never smaller by 2 as understood from the item (C), and a double carry from a further lower position will not occur in the case where the highest bits of the respective partial quotients are "1".

Figure 4:
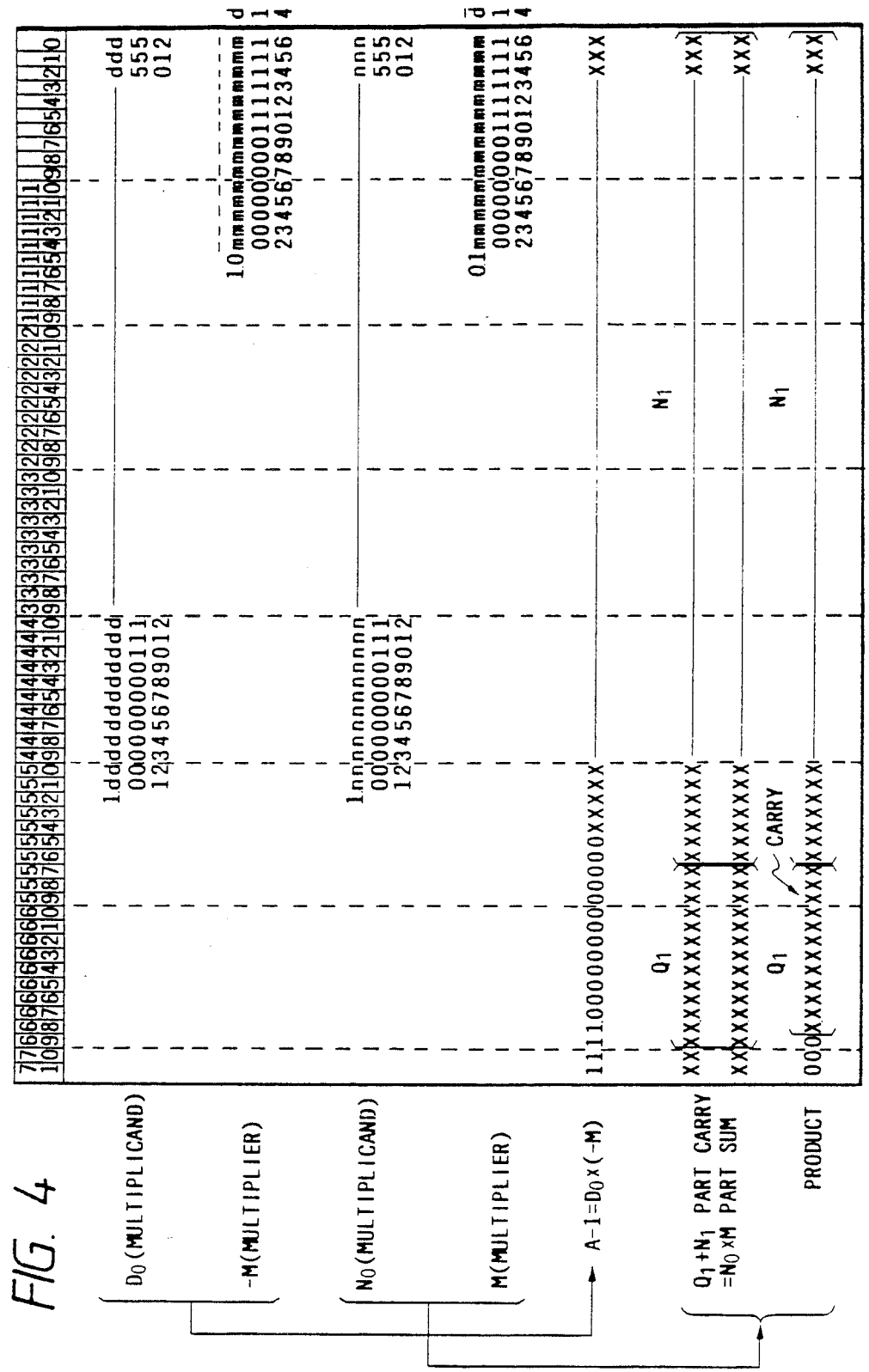
FIGS. 4 and 5 are diagrams showing conditions of various numbers which appear during an example of actual operation of the divide apparatus of FIG. 1.

FIG. 4 and FIG. 5 show conditions where the previously-mentioned calculating processes are executed for actual numbers. With reference to FIG. 4 and FIG. 5, in the case where the multiplier selection circuit 16 outputs a non-zero value as the lowest bit of a multiplier, the multiple generation circuit 18 generates a multiple which is equivalent to the addition of "1" to the bit having a position greater than the lowest bit of the multiplier by one. In FIG. 4 and FIG. 5, the bits of $Q_i$ are separated into 13-bit groups contained in respective brackets, and these are made into groups of 12 bits corresponding to $(\alpha+1)$ digits in the item (B) and the item (C) after the partial carry and the partial sum are added. Under conditions where $Q_i$ remains separated into a partial carry and a partial sum, the highest bit of the related 13-bit group is "0" when both the partial carry and the partial sum are positive or zero. Under the same conditions, when one of the partial carry and the partial sum is negative, the highest bit of the negative number is "1" and the highest bit constitutes a sign bit.

A description will be made on an actual example of the division in which a divisor $D_0$ and a dividend $N_0$ are set as follows.

$D_0 = 1.2345680000000$(hexadecimal notation)

$N_0 = 1.23456789ABCDE$(hexadecimal notation)

(i) The bits of $D_0$ whose positions are equal to or above $2^{-13}$ are expressed as:

1.2340(hexadecimal) = 1.0010 0011 0100 0(binary)

In addition, $1/(1.0010\ 0011\ 0100\ 0 + 2^{-13}) = 0.1110\ 0000\ 1111\ 1101$(binary)
$= 0.E0EFD$(hexadecimal)

Therefore, M is given as below also in view of $D_{0,14} = 1$. In the following, numbers without being followed by a word of a type of notation are expressed in a hexadecimal notation, and partial carry values and partial sum values are omitted for the simplicity of the description.

$-M = \ldots FF.1F03$ (ii) $A = 1 + D_0 \times (-M)$
$= 0.0003696838$ (iii) $Q_1 + N_1 = N_0 \times M$
$= 0.FFFC962FC962EE766$ $Q_1 = 0.FFE$
$N_1 = 0.001C962FC962EE766$ (iv) $2^{11} \cdot (Q_2 + N_2) = 2^{11} \cdot (A \times Q_1 + N_1)$
$= 0.FFF956A2DF73B3$ $2^{11} \cdot Q_2 = 0.FFE$
$2^{11} \cdot N_2 = 0.001956A2DF73B3$ (v) $2^{22} \cdot (Q_3 + N_3) = 2^{22} \cdot (A \times Q_2 + N_2)$
$= 0.E5FCEF536598$ $2^{22} \cdot Q_3 = 0.E5E$
$2^{22} \cdot N_3 = 0.001CEF536598$ (vi) $2^{33} \cdot (Q_4 + N_4) = 2^{33} \cdot (A \times Q_3 + N_3)$
$= 0.FFFCCED708$ $2^{33} \cdot Q_4 = 0.FFE$
$2^{33} \cdot N_4 = 0.001CCED708$ (vii) $2^{44} \cdot (Q_5 + N_5) = 2^{44} \cdot (A \times Q_4 + N_4)$
$= 1.01BE9097C8$ $2^{44} \cdot Q_5 = 1.01A$
$2^{44} \cdot N_5 = 0.001E9097C8$ (viii) $2^{55} \cdot (Q_6 + N_6) = 2^{55} \cdot \{A \times (Q_5 + 2^{-55}) + N_5\}$
$= 1.0FFFC3B31$ $Q^* = 0.FFE + 0.FFE \times 2^{-11} + 0.E5E \times 2^{-22} +$
$0.FFE \times 2^{-33} + 1.01A \times 2^{-44} + 2^{-55}$
$= 0.FFFFFF9800001C$ The remainder multiplied by $M$:
$0.0FFFC3B31 \times 2^{-55} = 0.000000000000001FFF87662$ With respect to the mantissa of a quotient of the double-accuracy division of floating point numbers which is shown in "IEEE Standard for Binary Floating-Point Arithmetic" ANSI/IEEE Std 754-1985, the $2^{-53}$ bit and the $2^{-54}$ of $Q^*$ are used as a guard bit and a round bit respectively, and the logical or between the $2^{-55}$ bit of $Q^*$ and the part of $2^{55} \cdot (Q_6 + N_6)$ lower than the decimal point is used as a sticky bit.

The divide apparatus of this embodiment dispenses with a subtracter which would be necessary for the correction of a quotient in the prior art. In addition, the reiterative calculations in the division are executed in the form of a partial carry and a partial sum, and thus the time of the execution of the division can be short.

DESCRIPTION OF THE SECOND PREFERRED EMBODIMENT

Figure 6:
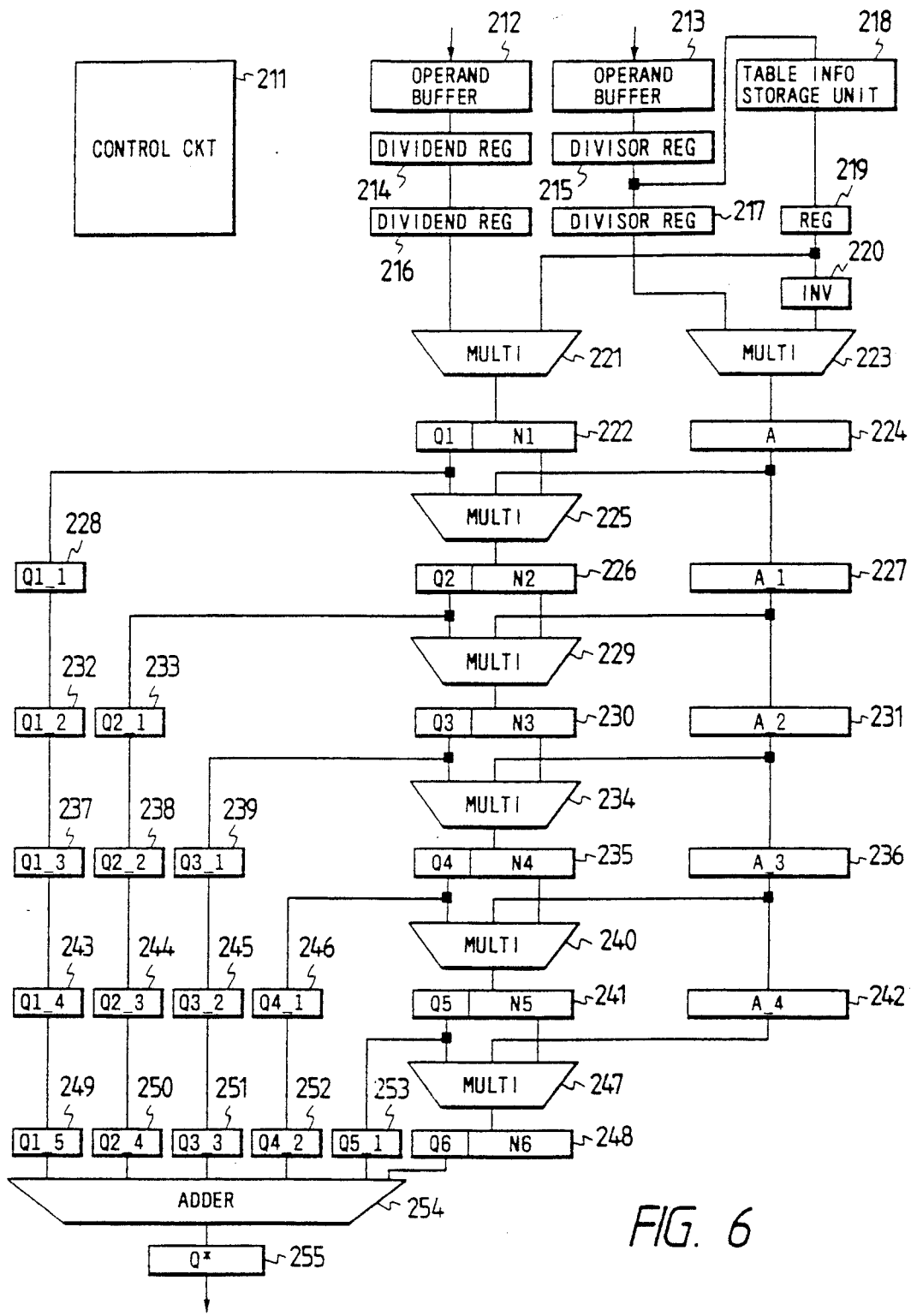
FIG. 6 is a block diagram of a divide apparatus according to a second embodiment of this invention.

FIG. 6 shows a vector divide apparatus according to a second embodiment of this invention. With reference to FIG. 6, a control circuit 211 carries out the control of a whole system including operand buffers 212 and 213, a dividend register 214, a divisor register 215, a dividend delay register 216, a divisor delay register 217, a table information storage unit 218, an approximate reciprocal register 219, an inverter 220, multiplying devices 221, 223, 225, 229, 234, 240, and 247, registers 222, 224, 226, 230, 235, 241, 245, and 255, delay registers 227, 228, 231, 232, 233, 236, 237, 238, 239, 242, 243, 244, 245, 246, 249, 250, 251, 252, and 253, and a carry propagate adder 254.

A dividend vector element and a divisor vector element are transferred from memories (not shown) or vector registers (not shown) to the operand buffers 212 and 213 by the control operation of the control circuit 211. A division result vector element is transferred from the register 255 to memories (not shown) or vector registers (not shown) by the control operation of the control circuit 211.

A description will now be made on the operation of the divide apparatus. The operation of the divide apparatus is separated into the following several successive stages.

During the first stage of the operation, a dividend vector element and a divisor vector element are set in the dividend register 214 and the divisor register 215 respectively. An approximate reciprocal M of the divisor is read out from the table information storage unit 218 in response to given higher bits of the divisor.

During the second stage of the operation, the dividend vector element and the divisor vector element from the dividend register 214 and the divisor register 215 are set in the delay registers 216 and 217 respectively, and the approximate reciprocal M is set in the approximate reciprocal register 219. In addition, the multiplying device 221 executes the multiplication "$N_0 \times M$", and the inverter 220 converts the approximate reciprocal M into a corresponding negative number. Then, the multiplying device 223 executes the multiplication "$D_0 \times M$".

During the third stage of the operation, the result "$Q_1+N_1$" of the multiplication by the multiplying device 221 is set in the register 222. In addition, the number A which is obtained by adding "1" to the result of the multiplication by the multiplying device 223 is set in the register 224. The addition of "1" is realized by such a process that the part of the multiplication result which has positions equal to and above $2^0$ are made equal to 0. Next, the multiplying device 225 executes the calculation "$A \times Q_1 + N_1$".

During the fourth stage of the operation, the result "$Q_2+N_2$" of the calculation by the multiplying device 225 is set in the register 226, and A and $Q_1$ are set in the delay registers 227 and 228 respectively. Next, the multiplying device 229 executes the calculation "$A \times Q_2 + N_2$".

During the fifth stage of the operation, the result "$Q_3+N_3$" of the calculation by the multiplying device 229 is set in the register 230, and A, $Q_1$, and $Q_2$ are set in the delay registers 231, 232, and 233 respectively. Next, the multiplying device 234 executes the calculation "$A \times Q_3 + N_3$".

During the sixth stage of the operation, the result "$Q_4+N_4$" of the calculation by the multiplying device 234 is set in the register 235, and A, $Q_1$, $Q_2$, and $Q_3$ are set in the delay registers 236, 237, 238, and 239 respectively. Next, the multiplying device 240 executes the calculation "$A \times Q_4 + N_4$".

During the seventh stage of the operation, the result "$Q_5+N_5$" of the calculation by the multiplying device 240 is set in the register 241, and A, $Q_1$, $Q_2$, $Q_3$, and $Q_4$ are set in the delay registers 242, 243, 244, 245, and 246 respectively. Next, the multiplying device 247 executes the calculation "$A \times (Q_5 + 2^{-55}) + N_5$".

During the eighth stage of the operation, the result "$Q_6+N_6$" of the calculation by the multiplying device 247 is set in the register 248, and $Q_1$, $Q_2$, $Q_3$, $Q_4$, and $Q_5$ are set in the delay registers 249, 250, 251, 252, and 253 respectively. Next, the carry propagate adder 254 executes the calculation "$Q_1+Q_2+Q_3+Q_4+Q_5+Y$(the highest digit of $Q_6$)".

During the ninth stage of the operation, the final quotient Q* being the result of the calculation by the carry propagate adder 254 is set in the register 255.

The previously-mentioned nine stages are executed for respective times each corresponding to one machine cycle. Accordingly, in the case where a dividend vector element and a divisor vector element are fed for each of one machine cycles, after a first final quotient is derived and set in the register 255, a quotient vector element is outputted from the register 255 for each of one machine cycles.

The bit lengths of the multiplicand A, the multiplier $Q_{i-1}$, and the number $N_{i-1}$ remain fixed during the reiterative calculations in the division. Accordingly, the divide apparatus can be formed by using a plurality of same-type LSIs. In this case, the cost of the divide apparatus can be low. In addition, the multiplying devices which execute the reiterative calculations can be composed of repeatedly-used macro-cells, and the cost of the divide apparatus can be low.

What is claimed is:

1. A divide apparatus comprising:
    means for determining an approximate reciprocal M of a divisor $D_0$ in dependence on given higher bits of the divisor $D_0$;
    multiplying means for multiplying a dividend $N_0$ by the approximate reciprocal M to derive a quotient; wherein said multiplying means comprises:
    means for executing the following reiterative calculations:

$$A = 1 - D_0 \times M$$

$$Q_1 + N_1 = N_0 \times M$$

$$Q_i + N_i = A \times Q_{i-1} + N_{i-1} (i \geq 2)$$

where A denotes a coefficient used as a factor used as a multiplicand of $Q_{i-1}$ when $Q_i$ is calculated therefrom, $Q_i$ denotes a partial quotient, and $N_i$ denotes a number obtained by subtracting $Q_i$ from an (i−1)-th partial remainder multiplied by M;
    means for executing the following calculation:

$$Q_{LAST+1} + N_{LAST+1} = A \times (Q_{LAST} + L) + N_{LAST}$$

where $Q_{LAST}$ denotes a last partial quotient, and L denotes a number having a magnitude corresponding to a lowest bit of the last partial quotient $Q_{LAST}$;
    a plurality of multiple generators for scanning multipliers for multiplicands thereby to generate multiples of said multiplicands;
    a plurality of carry-save adders connected to the multiple generators and having tree structures for outputting a partial sum and a partial carry;
    a carry propagate adder connected to the carry-save adders for adding the partial sum and the partial carry;
    means for feeding the partial sum and the partial carry to the multiple generators as a multiplier with respect to the partial quotient $Q_{i-1}$; and
    means for inputting the partial sum and the partial carry into the carry-save adders with respect to the number $N_{i-1}$; the divide apparatus further including:

means connected to said multiplying means for storing the respective partial quotients $Q_1, Q_2, \ldots, Q_{LAST}$; and means for calculating a final quotient $Q^*$ from the partial quotients by reference to the following equation:

$$Q^* = Q_1 + Q_2 + \ldots + Q_{LAST} + Y(\text{the highest bit of } Q_{LAST+1})$$

and for outputting the final quotient $Q^*$.

2. A divide apparatus comprising:

means for determining an approximate reciprocal M of a divisor $D_0$ in dependence on given higher bits of the divisor $D_0$;

multiplying means for multiplying a dividend $N_0$ by the approximate reciprocal M to derive a quotient;

wherein said multiplying means comprises:

means for executing the following reiterative calculations:

$$A = 1 - D_0 \times M$$

$$Q_1 + N_1 = N_0 \times M$$

$$Q_i + N_i = A \times Q_{i-1} + N_{i-1} (i \geq 2)$$

where A denotes a coefficient used as a factor used as a multiplicand of $Q_{i-1}$ when $Q_i$ is calculated therefrom, $Q_i$ denotes a partial quotient, and $N_i$ denotes a number obtained by subtracting $Q_i$ from an $(i-1)$-th partial remainder multiplied by M;

means for executing the following calculation:

$$Q_{LAST+1} + N_{LAST+1} = A \times (Q_{LAST} + L) + N_{LAST}$$

where $Q_{LAST}$ denotes a last partial quotient, and L denotes a number having a magnitude corresponding to a lowest bit of the last partial quotient $Q_{LAST}$;

multiplying devices, whose number is equal to a number of times of multiplication, for executing reiterative calculations;

a first multiplying unit for calculating a product of the divisor $D_0$ and the approximate reciprocal M;

a second multiplying unit for calculating a product of the dividend $N_0$ and the approximate reciprocal M, wherein the first and second multiplying units are arranged in parallel, and wherein the multiplying devices are arranged in series with the first and second multiplying units; and a plurality of registers connected between the multiplying devices and the first and second multiplying units for providing synchronization among the multiplying devices and the first and second multiplying units; the divide apparatus further including:

means connected to said multiplying means for storing the respective partial quotients $Q_1, Q_2, \ldots, Q_{LAST}$; and means for calculating a final quotient $Q^*$ from the partial quotients by reference to the following equation:

$$Q^* = Q_1 + Q_2 + \ldots + Q_{LAST} + Y(\text{the highest bit of } Q_{LAST+1})$$

and for outputting the final quotient $Q^*$; and a plurality of delay registers for delaying and storing the number A in synchronism with the reiterative calculations.

3. A divide apparatus comprising:

means for determining an approximate reciprocal M of a divisor $D_0$ in dependence on given higher bits of the divisor $D_0$;

multiplying means for multiplying a dividend $N_0$ by the approximate reciprocal M to derive a quotient;

wherein said multiplying means comprises:

means for executing the following reiterative calculations:

$$A = 1 - D_0 \times M$$

$$Q_1 + N_1 = N_0 \times M$$

$$Q_i + N_i = A \times Q_{i-1} + N_{i-1} (i \geq 2)$$

where A denotes a coefficient used as a factor used as a multiplicand of $Q_{i-1}$ when $Q_i$ is calculated therefrom, $Q_i$ denotes a partial quotient, and $N_i$ denotes a number obtained by subtracting $Q_i$ from an $(i-1)$-th partial remainder multiplied by M;

means for executing the following calculation:

$$Q_{LAST+1} + N_{LAST+1} = A \times (Q_{LAST} + L) + N_{LAST}$$

where $Q_{LAST}$ denotes a last partial quotient, and L denotes a number having a magnitude corresponding to a lowest bit of the last partial quotient $Q_{LAST}$;

multiplying devices, whose number is equal to a number of times of multiplication, for executing reiterative calculations;

a first multiplying unit for calculating a product of the divisor $D_0$ and a two's complement of the approximate reciprocal M;

a second multiplying unit for calculating a product of the dividend $N_0$ and the approximate reciprocal M, wherein the first and second multiplying units are arranged in parallel, and wherein the multiplying devices are arranged in series with the first and second multiplying units; and a plurality of registers connected between the multiplying devices and the first and second multiplying units for providing synchronization among the multiplying devices and the first and second multiplying units; the divide apparatus further including:

means connected to said multiplying means for storing the respective partial quotients $Q_1, Q_2, \ldots, Q_{LAST}$; and means for calculating a final quotient $Q^*$ from the partial quotients by reference to the following equation:

$$Q^* = Q_1 + Q_2 + \ldots + Q_{LAST} + Y(\text{the highest bit of } Q_{LAST+1})$$

and for outputting the final quotient $Q^*$; and a plurality of delay registers for delaying and storing the number A in synchronism with the reiterative calculations.

* * * * *